(12) United States Patent
Kirpichnikov et al.

(10) Patent No.: US 6,776,030 B1
(45) Date of Patent: Aug. 17, 2004

(54) METHOD OF INFORMATION COLLECTION AND PROCESSING OF SAMPLE'S SURFACE

(75) Inventors: Aleksei Petrovich Kirpichnikov, Moscow (RU); Sergei Petrovich Molchanov, Moscow (RU); Vjacheslav Vsevolodovich Dremov, Moskovskaya obl (RU)

(73) Assignee: Zakrytoye aktsionernoye obschestvo "Autex Ltd", Moscow (RU)

( * ) Notice: Subject to any disclaimer, the term of this patent is extended or adjusted under 35 U.S.C. 154(b) by 0 days.

(21) Appl. No.: 09/890,265

(22) PCT Filed: Feb. 7, 2000

(86) PCT No.: PCT/RU00/00040

§ 371 (c)(1),
(2), (4) Date: Aug. 8, 2001

(87) PCT Pub. No.: WO00/46568

PCT Pub. Date: Aug. 10, 2000

(30) Foreign Application Priority Data

Feb. 8, 1999 (RU) .......................................... 99102369

(51) Int. Cl.[7] .......................... G01B 7/34; G01N 13/10; G01N 13/16
(52) U.S. Cl. .......................... 73/105; 702/168; 702/189
(58) Field of Search ................... 73/105; 250/306–307; 702/168, 189

(56) References Cited

U.S. PATENT DOCUMENTS

| | | | | |
|---|---|---|---|---|
| 5,266,801 A | * | 11/1993 | Elings et al. ............... | 250/306 |
| 5,289,004 A | * | 2/1994 | Okada et al. ............... | 250/306 |
| 5,406,832 A | | 4/1995 | Gamble et al. ............... | 73/105 |
| 5,418,363 A | | 5/1995 | Elings et al. ............... | 250/306 |
| 5,477,732 A | | 12/1995 | Yasue et al. .................. | 73/105 |
| 5,553,487 A | * | 9/1996 | Elings ......................... | 73/105 |
| 5,723,982 A | * | 3/1998 | Yasue et al. ............. | 250/306 X |
| 5,983,712 A | * | 11/1999 | Lindsay et al. ............... | 73/105 |

FOREIGN PATENT DOCUMENTS

| | | |
|---|---|---|
| EP | 0574234 B1 | 5/1997 |
| EP | 0584440 B1 | 9/1997 |

* cited by examiner

*Primary Examiner*—Thomas P. Noland
(74) *Attorney, Agent, or Firm*—Jacobson Holman PLLC

(57) ABSTRACT

The applied method is implemented in AFM[-microscopy] to get space distributions of surface properties and layers, placed on it. This method includes successive reading in predetermined points of the surface under control of force curve and subsequent constructions of images of appropriate distributions of parameters extracted from these force curves. The peculiarity of the method is that reading of force curve is carried out by noting of values of cantilever's deviation force and/or coordinate of its fixed end and/or derivatives from cantilever's deviation force of coordinate of its fixed end at least in points of control of force curve. Upon that, characteristics and parameters of sample's surface and/or surface layers, for instance, presence, quantity and thickness of surface layers, coordinates of sample's surface and limits of surface layers, as well as adhesion, elastic and friction properties of surface and layers, are diagnosed by a number of points of control and/or noted values of cantilever's deviation force and/or coordinate of its fixed end and/or derivatives from cantilever's deviation force of coordinate of its fixed end in appropriate points,

30 Claims, 10 Drawing Sheets

AMD00TC1 X=15382 Å
Y=15382 Å
Z=1601 Å

AMD00TA1 X=15382 Å
Y=15382 Å
Z=692 Å

AMD00AD1 X=15382 Å
Y=15382 Å
Z=1179 Å

POLARTC1 X=2.0μm
Y=2.0μm

POLARAD1 X=2.0μm
Y=2.0μm

METHOD OF INFORMATION COLLECTION AND PROCESSING OF SAMPLE'S SURFACE

BACKGROUND OF THE INVENTION

The invention relates to measuring technique, in particular, to scanning probe microscopy (SPM), in particular, to atomic force microscopy (AFM), to means of topography control and surface properties of samples with the help of scanning probe microscope, and it can be used for receiving of spatial distributions of surface properties and layers, placed on it. In AFM for investigation of sample's surface interaction forces between surface and probe, which is placed very closely to surface (~1 nm) or right on it, are measured. Upon that electric and magnetic forces, besides forces of interatomic interaction, can be registered both in AFM-microscopy and in the applied method.

The highest resolution is achieved upon surface scanning, however, the result is affected by variable friction coefficient owing to tangent slip, by abrasion of probe (the probe can be simply damaged during collision with unevenness, for instance, with walls of surface grooves) and by other factors, caused by constant contact. Besides, friction force hampers probe's movement frequently, bringing in sufficient error, and surface layer is destroyed within scanning process. And finally, adhesion forces bring in sufficient error, holding probe down to surface, increasing friction force upon that, and additionally deforming sample's surface.

An attempt to get over this drawback was done in noncontact vibration methods of microscopy. So noncontact vibration method of information collection and processing is known in scanning probe microscopy, including setting probe, placed at free end of spring console—cantilever, in oscillation by harmonic signal at a frequency of mechanical resonance, maintenance of average distance between probe and surface to be constant and registration of probe coordinates without harmonic component (see EP No0574234, G01B21/30, 1993). The amplitude of probe oscillation changes upon approach of probe to the surface under investigation, consequently their interaction. A tracking system maintains average distance between probe and surface to be constant during scanning process above site under investigation, so that amplitude of probe oscillations is kept equal to predetermined magnitude. As a result, trajectory of probe displacement, disregarding harmonic component, repeats surface's topography, so the coordinates of this trajectory draw up an image of surface under investigation.

Also vibration method of information collection in scanning probe microscopy is known, including setting probe, placed at a free end of cantilever, in oscillation by harmonic signal at a frequency, differing from frequency of mechanical resonance, maintenance of average distance between probe and surface to be constant and registration of probe coordinates without taking into account harmonic component of oscillation phase of cantilever (U.S. Pat. No. W5406832, G01B5/00, 1995). Upon that, average trajectory of probe displacement repeats surface's topography, and map of change of signal phase indirectly characterizes distribution of its properties, as measured shift of phase is none other than a time, when probe is in contact with surface at every point under investigation. This time depends on the magnitude of local adhesion force in appropriate point. Thus the result of use of this kind of information collection is a map, providing distribution of local adhesion force in each point of investigated surface.

Drawbacks of vibration methods are low resolution and indirect character of surface parameters' determination, which result in insufficient accuracy and reliability of received data. Moreover, vibration methods do not enable to separate information about properties of surface layers and sample's surface itself, about its different parameters (owing to ambiguous understanding of reasons of shift of registered parameters); and signal conversions used within their realizabon (for instance, within figuring out of adhesion force using results of phase measurement) and tracking systems (that provide constancy of amplitude) introduce additional errors into final result.

Also a "jumping" method of scanning probe microscopy is known, including measurement of probe coordinates during the process of its approach to sample and move apart of sample and probe with subsequent topography imaging according to measured magnitudes of coordinates in reverse point, moreover the approach is carried out before achievement of constant interaction force: feedback circuit is used for this purpose (see EP No 0584440, G01B7/34, 1993). The information about topography is recorded and used within a generation of probe trajectory during the process of surface scanning; that gives possibility to increase capacity of the method and, at the same time, to exclude undesirable tangent slip of probe on surface. However, this method is not enough informative, as it does not enable to get properties distribution on sample's surface, image of layers, placed on surface. The known method has also high level of error, as it does not consider, that probe deforms surface owing to adhesion force, caused by surface layers and surface heterogeneity. Neglected deformation can depend on properties, distribution, thickness of surface layers, and on variation of properties of surface itself.

Method of information collection and processing within surface scanning is known from U.S. Pat. No. 5,418,363, G01B21/30, 1995. Accumulated data about topography in this method are used for accurate assignment of height of probe disposition above surface and for carrying out of independent electric and magnetic measurement during repeated scanning.

However, error component is not excluded from this method, which is caused by the fact, that information about topography and properties of surface is independently read, moreover topography data are influenced by parameters, characterizing physical properties of next to surface layers and surface contamination. Moreover, information about influence of sample's surface and layers, placed on it, can not be separated in that method.

Method A method of two-parameter control of a sample, is known including the noting of sample coordinate at the moment of achievement of predetermined magnitude of interaction force between sample's surface and probe during the process of surface scanning in order to draw up relief, as well as figuring out of adhesion at one point of surface using force curve, which is read in the conditions of contact between probe and sample, and distribution of the received magnitude of adhesion for all the points of surface.

Evidently, the above mentioned error component drops down upon this, but it is not excluded, and poor reliability of results due to some shifts of adhesion force, caused by heterogeneity of surface properties and shift of thickness of surface layers, really takes place.

The closest prior art to the applied method is method of information collection and processing of sample's surface, including approach of sample and probe, placed on cantilever, before achievement of predetermined magnitude of interaction force of sample's surface and probe before scanning, then noting of topography (of Z-coordinate) in each scanning point upon constant interaction force of sample and probe, reading of force curve portion within the process of instant contact of sample and probe and their subsequent short duration move apart (feedback circuit, retaining interaction force between sample and probe to be constant, is switched off during reading of force curve), storage of force curve and, according to it, determination of adhesion force in a predetermined point, stop for renewal of predetermined magnitude of interaction force between sample and probe and passing to the next point of surface (see U.S. Pat. No. 5,477,732, G01B21/30, 1995). Thus, measurement in each point of this method is carried out within two stages: at first topography is determined, when probe and sample are immobile, in fixed position at the beginning, then intensive force impulse influence is applied independently to sample, displacing it in the direction of probe, and force curve is read, which is used for calculation of magnitude of adhesion force. One of the variant to implement this method assumes also repeated reading of force curve in each point in order to average received values of adhesion.

This method is more informative than the previous one, as it gives possibility to determine two parameters in each point: topography and magnitude of adhesion force. However, it has some drawbacks.

In particular:

Low capacity, caused by two-step process of measurement, and also a necessity to memorize all the force curve at the beginning, and then to determine adhesion magnitude using its one point;

Probability of probe damage within the process of interaction with surface;

Lack of capability to control surface under layers, laying on it, without their destruction;

Lack of capability to control surface layers (probe sweeps them off within scanning process);

Noted adhesion magnitudes are superposition of influence of clean surface and contamination on it; the indicated influence can not be separated in known method;

Noted adhesion magnitudes are superposition of the simultaneous influence of the all surface structures, of all the layers of sample's surface itself; their influence can not be separated;

Method does not enable to determine thickness and distribution of layers, above-surface or on-surface, at the site under investigation;

Lack of possibility to control topography of surface layers relative to surface topography;

Surface and surface layers, during the process of adhesion determination, can be destroyed, that brings in non-controlled error into measurement results;

Limited functional capabilities: information about elastic, electric and any others properties of surface is fully absent;

Noted magnitudes are independent in the sense that method does not take into consideration their possible mutual influence; moreover, consideration of this influence can not be realized during subsequent processing of measured data, as they are received at different stages, in independent and different conditions (upon switched on and switched off tracking system);

Corrections, caused by presence of adhesion force and shift of surface properties, are not considered;

Systematical error is included within averaging of results, caused by possible destruction of next to surface layer by first measurement of force curve;

Sufficient errors and even limits for choice of surface for investigation take place, due to tangent slip within passing from point to point, which are caused by shift of friction force, depending on properties and character of surface topography.

So in other words, the known method has low accuracy, and authenticity of measuring data is not high (influence of surface contamination and layers, elastic properties of surface and other factors, resulting in mutual influence of measured magnitudes, are not taken into account, and also influence on results of friction force control), limited functional capabilities (it does not provide drawing of thickness and properties of surface layers) and insufficient reliability and capacity (that is caused by two-stage character of measurement, trajectory of relative motion of probe and sample).

It is clear from all the above mentioned, that one of the general drawbacks of all the existing methods of probe microscopy is impossibility to separate information about properties of "clean" sample's surface and parameters of layers, placed on it (or about properties of layers upon multi-layer structure of sample). So, vibration methods respond to surface layers first of all, but they can not single out information about surface, whereas layers, placed on sample's surface, are ignored essentially in contact and "jump" scanning microscopes.

Thus, technical result, expected from the applied invention, is expansion of functional capabilities of method of information collection and processing about topography and surface properties owing to receipt of separated distributions of properties and parameters of "clean" surface and all the structures layer-by-layer placed on it, upon simultaneous increase of accuracy and authenticity of measuring information, increase of capacity and reliability of the method, increase of its informativity and simplification in operation, as well as increase of accuracy and expansion of application field owing to guarantied exclusion of contact or of any other interaction between probe and sample upon passing from one surface point to another, and full exclusion of friction force.

The indicated result is achieved by the choice of points of control is carried out and values of cantilever's deviation force, and/or coordinates of its fixed end, and/or derivatives from cantilever's deviation force of coordinate of its fixed end at least in points of control of force curve are noted in method of information collection and processing about sample's surface, including successive reading in predetermined points of surface under control at least of a portion of force curve within the process of approach and/or move apart of sample, which follows reverse, and probe, placed on cantilever, and determination of sample's parameters with subsequent construction of appropriate space distributions, upon reading at least of force curve portion; upon that, parameters of sample characterizing topography and/or properties of sample's surface and/or a number and properties of its surface layers are determined according to a number of points of control, and/or to noted values of cantilever's deviation force, and/or to coordinate of its fixed end, and/or to derivatives from cantilever's deviation force of coordinate of its fixed end in appropriate points of control.

Besides, coordinates of sample's surface and/or limits of surface layers, or thicknesses of surface layers, or adhesion force of sample's surface and/or surface layers, or coefficient of elasticity of sample's surface and/or surface layers or frictional force of sample's surface and/or surface layers are used as parameters, characterizing topography and/or properties of sample's surface and/or a number and properties and its surface layers.

It is also recommended to form a set of arguments, using values of cantilever's deviation force and/or coordinate of its fixed end and/or derivatives from cantilever's deviation force according to coordinate of its fixed end at least in points of control; and to carry out determination of parameters by the way of forming of a set of functions according to received arguments and determination of their values.

Besides, points are chosen as points of control, if they limit quasi-rectilinear portions of force curve, and/or where force curve shifts its slope jumpy.

Upon that, points, where coordinate of fixed cantilever's end and/or its deviation force and/or its first or second derivatives, according to coordinate of the fixed cantilever's end, achieve threshold values, received, for instance, using results of the previous scanning or measurement, are chosen as points of control.

It is also expediently to carry out construction of space distributions relative to coordinate of sample's surface.

It is also admitted to carry out choice of points of control and/or reading of values of cantilever's deviation force and/or coordinate of its fixed end and/or derivatives from cantilever's deviation force of coordinate of its fixed end after filtration of a set of current values of cantilever's deviation force and coordinate of its fixed end.

Besides, determination of parameters according to noted values of cantilever's deviation force and/or coordinate of its fixed point and/or derivatives from cantilever's deviation force of coordinate of its fixed end (in the predetermined subset of points of control) can be carried out owing to values of the indicated magnitudes in the other subsets of points of control.

It is also recommended to carry out determination of parameters according to noted values of cantilever's deviation force and/or coordinate of its fixed end and/or derivatives of cantilever's deviation force according to coordinate of its fixed end in points of control, placed after and before or before and after absolute maximum of cantilever's deviation force within the process of their approach or move apart accordingly.

Upon that, a number of surface layers of sample can be determined as a number of points of control, limiting quasi-rectilinear portions of force curve, and/or points, where force curve shifts its slope jumpy within the process of approach or move apart of sample and probe, without unit and point of reverse, if it is included in the quantity of points of control.

Besides, initial points of quasi-vertical portions can not be taken into account within determination of a number of surface layers of sample.

It is also expediently to determine coordinate of surface sample according to relationship:

$$Ro=Zo-So,$$

where Ro is coordinate of sample's surface,
Zo, So is coordinate of cantilever's fixed end and magnitude of deviation of its free end at the moment of achievement by cantilever's deviation force of a value, equal to 0 or −A within approach of sample and probe and 0 or +A within move apart of sample and probe accordingly,
A is positive constant magnitude.

It is also admitted to diagnose coordinate of sample's surface, satisfying a condition Zt−St=constant,
where Zt and St are current values of coordinate of cantilever's fixed end and magnitude of deviation of its free end accordingly.

Besides, coordinates of limits of surface layers of sample can be determined as coordinates of the cantilever's fixed end in points of control, not including initial points of quasi-vertical portions within approach of sample and probe, and final points of quasi-vertical portions within move apart of sample and probe.

Upon that, coordinates of limits of surface layers of sample and their thicknesses can be determined according to relationship like:

$$Ri=Zi-Si, Di,$$

where Ri and Di are coordinate of i-layer's limit and its thickness accordingly, i=(0, 1, 2 . . . ),
Zi, Si are coordinate of cantilever's fixed end and magnitude of deviation of its free end accordingly in an appropriate point of control, not including initial points of quasi-vertical portions within approach of sample and probe and final points of quasi-vertical portions within move apart of sample and probe.

Besides, coordinates of limits of surface layers of sample relatively sample's surface and their thickness can be determined according to relationship like:

$$R'i=Zi-Si-Ro, Di,$$

where R'i and Di is coordinate of i-layer's limit relative to sample's surface and its thickness accordingly, i=(0, 1, 2 . . . ),
Zi, Si are coordinate of cantilever's fixed end and magnitude of deviation of its free end accordingly in appropriate point of control, not including initial points of quasi-vertical portions within approach of sample and probe and final points of quasi-vertical portions within move apart of probe and sample.

It is also expediently to determine coordinates of limits of surface layers of sample, measured within move apart or approach, relative to coordinate of surface, which is measured also within move apart or approach accordingly.

Upon that, adhesion force of surface layers of sample is determined by values of cantilever's deviation force in points of control, not including final points of quasi-vertical portions within move apart of sample and probe.

Besides, summary adhesion force of surface and surface layers of sample is determined as an absolute maximum of cantilever's deviation force within process of move apart of sample and probe.

It is also recommended to determine coordinate of surface limit of sample with a correction for summary adhesion force working between probe and sample, according to relationship like:

$$Roa=Ro+Fac/Kp,$$

where Roa is coordinate of sample's surface with a correction taking into account summary adhesion force working between probe and surface;
Fac is summary adhesion force of sample's surface;

$$Kp=Kk*tg\alpha/(1-tg\alpha)$$

Kk is coefficient of cantilever's elasticity for bending,
tgα is slope of force curve in the vicinity of point Zo.

Upon that, coordinate of sample's surface can be determined with a correction taking into account elastic properties of surface according to relationship like:

$Roy=Ro+So(Kk/Kp)$, upon $Ro=Zo-So$, $Roy=Zt-St+St(Kk/Kp)$, upon $Zt-St$=constant, where Roy is coordinate of surface.

It is also admitted to determine coefficient of elasticity of surface layers of sample according to relationship like:

$Ki=B*Kk*tg\alpha i/(1-tg\alpha i)$, where Ki is coefficient of elasticity of i-layer, tgαi is slope of a portion of force curve between appropriate points of control, B is coefficient of proportionality.

Besides, coefficient of elasticity of sample's surface can be determined according to relationship like:

$Kp=Kk*tg\alpha/(1-tg\alpha)$, where Kp is coefficient of elasticity of sample's surface.

Upon that, approach and/or move apart of sample and probe are carried out before achievement by cantilever's deviation force of threshold value.

It is also recommended to carry out reading of force curve in predetermined points of sample's surface under control more than one time, thus extent of probe influence on surface or sample's surface layers is determined by using difference of parameters of surface or sample's surface layers, correspondingly.

Besides, reading of force curve in predetermined points of sample's surface under control can be carried out within approach and move apart of sample and probe, and magnitude of residual deformation is determined, according to difference of received values of parameters.

Upon that, modulated electric potential is applied to conducting probe within the process of force curve reading; magnitude of electrostatic interaction force of probe and surface and/or surface layers of sample is determined from summary signal by means of demodulation.

It is also admitted to carry out reading of force curve in predetermined points of sample's surface under control more, than one time, upon different electric potential of conducting probe relatively sample's surface, determining magnitude of electrostatic interaction force of probe and surface and/or surface layers of sample, according to difference of received values of cantilever's deviation force.

Besides, reading of force curve in predetermined points of sample's surface under control can be carried out more, than one time, upon different electric potential of probe relatively sample's surface, determining magnitude of gradient of electrostatic interaction force of probe and surface and/or surface layers of sample, according to difference of received values of derivatives of cantilever's deviation force, according to coordinate of fixed end.

And finally, recording of magnitude of tunnel current between conducting probe and sample's surface can be carried out together with reading of force curve or its portion; received set of values can be used for construction of distribution of surface conductance and/or of surface layers of sample.

Thus, collection of information about surface topography and its properties, quantity of surface layers, their thickness, configuration and properties are not divided in time in the applied method; all the measurements are carried out simultaneously in present point of surface, within the process of reading of force curve, in particular, within probe lowering and lifting.

The above mentioned reading of force curve is defined as a process, including coordinates tracking of this curve (by F force, influencing probe, placed at cantilever or, by just the same S magnitude or, angle of probe deviation, and Z coordinate of its fixed end) and dF/dZ derivative (also the second and/or the third derivatives in particular cases), and also noting of Fi, Zi values and, if it is necessary, of dF/dZ in informative points of force curve, forming a set of arguments. All the volume of measurement information, values of the whole range of magnitudes, characterizing surface structure of sample, are received from analysis of force curve and, furthermore, from its individual informative points, above mentioned points of control. That does not only extend functional capacities of the method, but it makes measured magnitudes comparable, it enables to correct some of them using the others, to determine some of them relative to the others, to separate information about properties of objects on surface and properties of surface itself, to make maps of distributions, corresponding with surface topography and relative to this topography, determined owing to a range of corrections, and representing real image of surface layers and their characteristics.

The peculiarity of the applied method is that points of control (informative points), chosen by operator or processor, are registered at force curve. Coordinates of chosen points, magnitudes of distances between them, magnitudes of slopes and derivatives of portions of force curve and differences between them have information about different characteristics of surface under investigation, molecular layers, laying on it, and investigating probe. There is possibility to form maps of distributions of values of the appropriate characteristics of surface or objects, laying on it, (on a site under investigation), by registration and processing these above mentioned data, putting them in accordance with coordinates of surface points, where they are received, taking them for processing them according to the above mentioned algorithms.

Points of control are the most informative points of force curve, where it (or its derivative) shifts slope or achieves threshold values, including predetermined values with a defined step of quantization, for example, according to Z coordinate.

Points, limiting quasi-vertical portions, are of great importance within characterizing of surface layers.

"Quasi-vertical", "quasi-horizontal" or "quasi-rectilinear" portions and parts are portions and parts, which can be considered to be these types with a predetermined degree of accuracy with surface coordinate, moreover it is determined apart from measurement, but by means of processing of the measurement results, taking into account a range of corrections.

We notice also, that S (So) is a magnitude, having a sign. It is positive upon bending of cantilever to the side of sample, and it is negative upon opposite situation.

It should be explained, the below used term "coordinate", depending on the context, is used so as for marking of coordinate of point of force curve, i.e. its projection on S and Z axis, as for marking of coordinate of any point in space, in particular, of probe coordinate, which is in predetermined point of force curve, in space. Coordinate in space is just the same projection on Z axis, but not a fixed end is placed on it now, but free one is on cantilever (probe). When probe is on sample's surface or layer, its coordinate coincides with coordinate of appropriate surface.

Terms, used in this description, will become more clear from the foregoing examples of the method implementation, however we should explain right away, that data about surface, properties of surface and surface layers implies also their geometrical parameters and characteristics, coordinates and thickness. Upon that, "soft"layers are included in a number of surface layers, through them probe goes freely or deforms freely, and they are placed on sample's surface (it can be any adsorbed layers: contamination, water, two-dimension condensed gas (steam) etc., they are called "above-surface" here), as well as "hard" layers are, where probe enters into or deforms them upon sufficient effort (these are structures of surface itself, all kinds of hard coatings etc. are called "below-surface" here).

Reading of portions of force curve is carried out as in the all the other known methods upon predetermined placement of both sample and probe, i.e. upon their unalterable placement in horizontal plane, if both vertical approach and move apart are carried out. In other words, it is a question of one of surface points, where probe and/or sample (only their relative position is important; one of them or both can move) move horizontally after reading of force curve, and process of force curve reading goes on in next point, in such way that received values of functions can be used for construction of space distributions of appropriate parameters and properties.

Force curve is defined as a curve of dependence of value of deviation force of cantilever's free end with probe from value of coordinate of position of fixed cantilever's end or as any curve of dependence, received from this curve, for example, curve of dependence of deviation force of cantilever's free end from distance between probe and surface.

We should also make a slip, that force curve is defined as not all force curve without fail, but also its predetermined portion or their set.

The peculiarity of proposal is also determination of a set of noted magnitudes as a cantilever's deviation force and/or coordinate of its fixed end and/or its derivatives (for instance, the first and the second one) from cantilever's deviation force according to coordinate of its fixed end.

It should be stipulate that usage of coordinates of sample's surface and/or limits of surface's layers, or thickness of surface layers, or adhesion force of sample's surface and/or surface layers, or elasticity coefficient of sample's surface and/or surface layers in the capacity of informative parameters implies usage of one or several enumerated magnitudes.

The term "filtration" means in this case a cut-off of high-frequency components by this or that method. Filtration can be carried out both during the process of force curve reading and directly with data, read earlier. F and Z magnitudes are registered non-stop, measured (or assumed like Z, for instance), as well as F', F" derivatives etc. (all magnitudes or only their part), however only their values in points of control are noted and then used for comparison, construction of distributions and processing. Upon that, cut-off of high-frequency components in registered F and Z magnitudes enables to decrease error within determination of points of control and noting of arguments' values in them. Assignment of points of control and threshold values, and also interpretation of measurement results in them (and, therefore, in surface points under control), can be carried out, taking into account values, beforehand or afterwards noted in these and those points of control, both within the process of the previous or further scanning of given (or even another) sample and within reading of previous, further or current force curve in given point of surface.

Thus, process of reading of force curve in proposal can take place during two stages in each predetermined point of surface under control: a) coordinates of all points of force curve are measured and/or derivatives are determined in these points continuously and subsequently; these data are used right after receipt, for example for determination of change point, achievement of threshold value etc., or they are recorded in on-line storage for short period of time, not exceeding time interval, necessary for force curve reading in predetermined point of surface, or they are used with a delay, after that they are deleted in both cases, b) points of control are noted; data, received and recorded at the first stage, are used for that as criteria for determination of points of control. At the same time, for choice of points of control, not current values can be used, but values or their functions can be, relating to points of control, received during previous reading of force curve in predetermined point of surface or even in point of previous scanning.

It is obvious from the foregoing, that reverse is transition from approach of probe and sample to their move apart, and noting is essentially defined as a process of recording and using of measured values. In other words, reading of force curve includes measuring of current values and further noting of all or a part of them.

In accordance with the accepted terminology, adhesion force, defined or taken into account in this method, will be a summary force of cantilever's breaking off, including adhesion, capillary and all other possible components.

It also should be stressed, that all foregoing actions to determine forms and parameters of force curve, including finding of points of control, are carried out as a rule, above signal, which has come through preliminary processing, filtration in particular, i.e. development of legitimate signal at the background of noises of different nature (noises from device and outside noises). That can be carried out with the help of processor; detector for shift of signal parameters (fault detector) is used for this purpose, which makes prognostification of extreme point of pseudoregular signal, using a priori information about additive noise and perturbation.

We also emphasize, that the easiest case of a set of forming functions (arguments) is one function (argument). For example, if values of cantilever's deviation force in "a" and "b" points of control and the second derivative from cantilever's deviation force of coordinate of its fixed end in "c" point of control are considered as arguments; noted values of these magnitudes are a set of arguments' values, and determination of parameters of sample is carried out by forming of F function using received arguments (e.g., as $F=f_a-f_b+k*f''_c$, where k is coefficient) and determination of their values is carried out by substitution of values of arguments.

SUMMARY OF THE INVENTION

Briefly, and in general terms, the method of the present invention can be used in AFM[microscopy] for the purpose to get space distributions and layers, placed on it.

The method provides successive reading in points of control of surface under control of force curve and subsequent construction of image of appropriate distribution. The peculiarity is that reading of force curve is carried out by noting of values of cantilever's deviation force and/or coordinates and/or derivatives from cantilever's deviation force of coordinate of its fixed end at least in points of control of force curve.

These and other aspects and advantages of the invention will become apparent from the following detailed description, and the accompanying drawings, which illustrate by way of example the features of the invention.

DESCRIPTION OF THE DRAWINGS

Block diagram of device to implement the method is shown in

FIG. 1, cantilever is drawn up separately in

Experimental force curves are shown in

Figure 16:
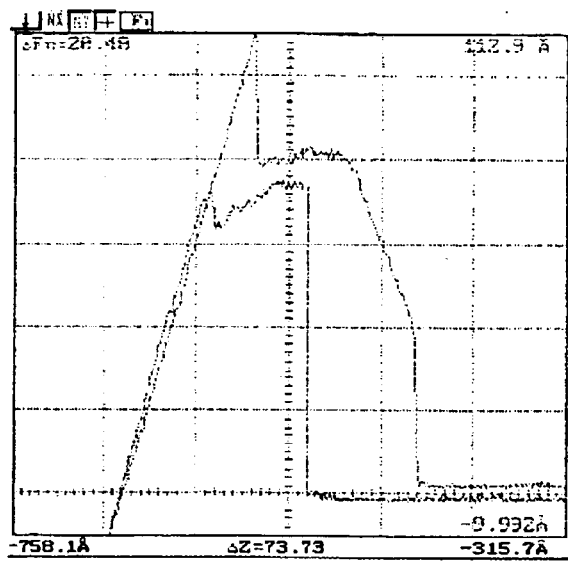
Figure 17:
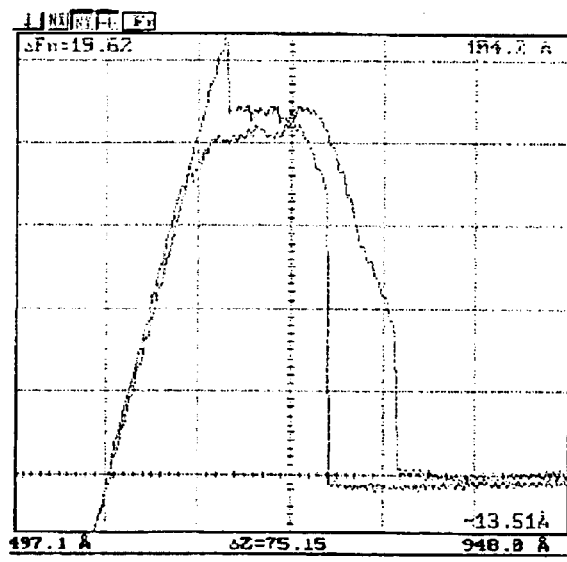
Figure 18:
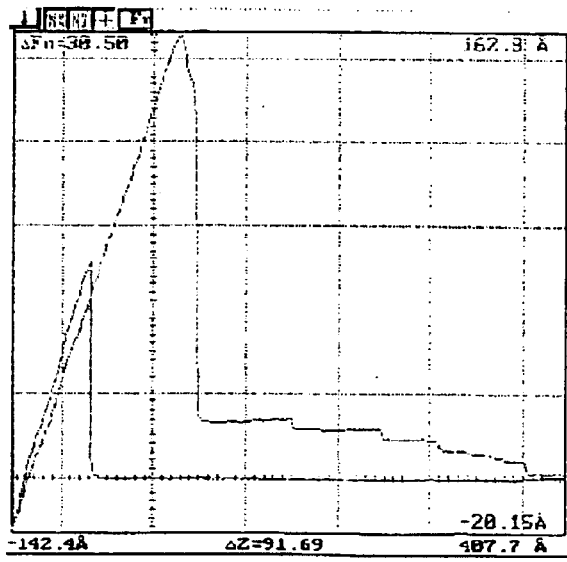

FIGS. 16–18, read on surfaces, covered by surface layers.

Figure 1:
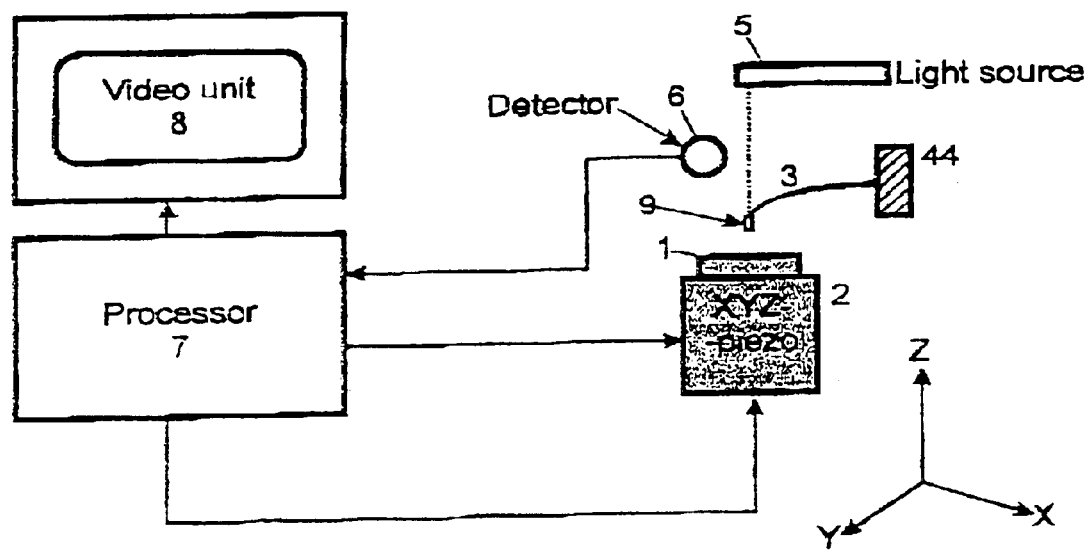
Figure 2:
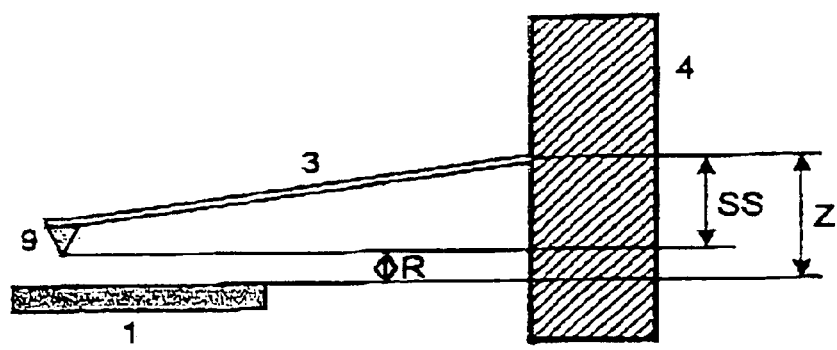
FIG. 2.

Sample 1 is set up on three-coordinate XYZ-piezo 2 in the device, shown in FIG. 1. Cantilever 3, fastened on support 4, is placed above surface of sample 1. Light beam, emitted by laser source 5, reflects from cantilever 3 and goes to detector 6, connected to input of processor 7, controlling operation of piezo-element 2. Information output of processor 7 is connected with input of video unit (visual display, unit of memory and indication) 8. Probe 9 is set up at a free end of cantilever 3. Upon that, it is necessary to take into account, that any known AFM device, including devices given in the above mentioned sources of information, can be used for the purpose of implementation of the applied method.

DESCRIPTION OF THE PREFERRED EMBODIMENT

The method is implemented in a following way. Force curve, i.e. dependence of magnitude of cantilever's 3 bending (S in FIG. 3–5), where probe 9 is placed, on the distance from sample 1 to surface, sample 1 is fastened on support 4 of cantilever's 3 end (Z in FIG. 2–5), is read in each point of site under investigation of sample's surface. Magnitude of bending, proportionally with F force of interatomic interaction, which influences cantilever 3, is registered by detector 6 (it usually reacts at magnitude or angle of deviation of cantilever 3, they both are in proportion with deviation force, causing them).

Information from output of detector 6 is passed to processor 7, where it is processed by the proposed or known algorithms. Moreover, algorithms, mentioned below, can be used both directly or as a part of known data or for their correction. Moreover, it should be stressed that as it will become plain from further description, the method can be implemented in "handle" mode without usage of processor for processing of measurement results, and it can be also done in semi-automatic mode, when processor is used only for construction of distributions in points of control, chosen by operator.

Processor, shown in the device in FIG. 1, carries out control after XYZ-piezo 2, which brings nearer at the beginning and then moves away sample 1 from probe 9 in points of scanning, also it carries out scanning itself.

Approach of cantilever with probe to surface in chosen points (or in each point) before fulfilling of any predetermined term (within scanning of chosen site of investigated object), for instance, before achievement of zero or negative (reverse) deviation of cantilever 3. After fulfillment of this term, direction of cantilever's 3 motion, shifts to the contrary and goes on at defined distance. As a rule, stop of probe 9 is carried out after its leaving of the area of interaction with object under investigation. Probe's 9 displacement to next point of scanning is carried out after stop of motion, and all the process is repeated. Registration of force curve is carried out within approach and move apart of cantilever 3. Force curve can be put into memory and processed afterwards or at once, i.e. points or portions, predetermined by operator, and also their parameters are determined at force curve, too; if it is necessary, calculations are made and results are recorded in appropriate files. Points or portions, predetermined by operator, also can be determined, processed and recorded right during registration of force curve, upon fulfillment of terms, defining these points and portions.

Only couples of values or independent values or derivatives in typical points, forming a set of arguments, are noted within reading of force curve. Values of parameters, characterizing properties of surface under investigation or objects on it, are determined by using of noted values of arguments (explanations of how it will be done are stipulated below). Coordinates of a point of investigated surface are put in accordance with each received value of function; values of the same type from all force curves are recorded in independent files, thus forming maps—images of distributions of values of appropriate characteristics of surface or objects, laying on it, at site under investigation.

Let us consider force curve in detail (see FIG. 3–4, where force curves are drawn up in coordinates S, Z, and position of cantilever in some points of control is shown below).

Figure 3:
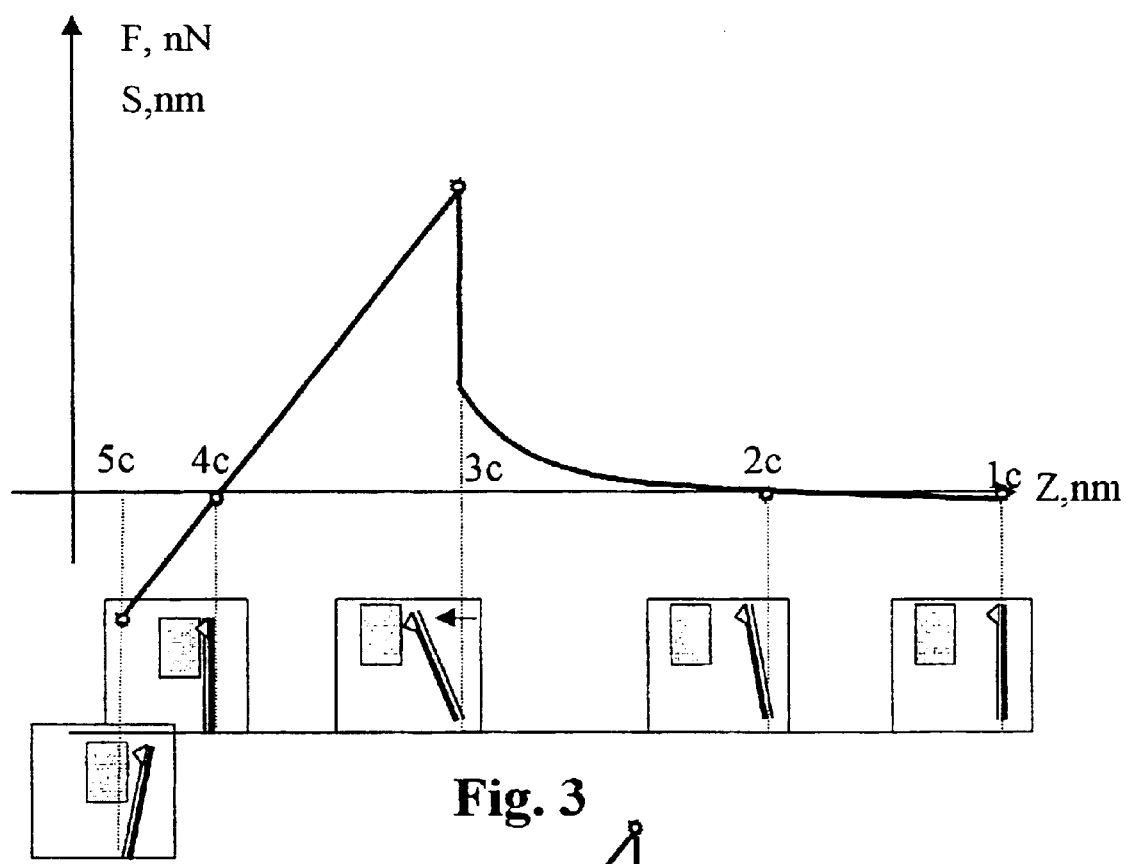
FIG. 3 and 4 illustrate parts of force curve, typical for clean surface without surface layers, moreover, during approach of surface and probe in FIG. 3 and during their move apart in FIG. 4. Force curve (within both approach and move apart) is schematically shown in FIG. 5, which is typical for surface with surface layers (both above-surface and below-surface) and its typical points and parts are marked; variants of algorithm of processor operation are shown in FIGS. 6–8, simultaneously explaining step-by-step process of implementation of the applied method; and structures and distributions, realized by using of the applied method, are shown in FIGS. 9–15. So maps of distributions, received at the surface of polymer, containing clusters of cadmium and partially covered by a layer of adsorbed water, are drawn up in FIG. 9–11. In particular, a map of topography of polymer surface, including clusters of cadmium, is shown in FIG. 9, a map of surface coordinates of adsorbed layer relative to polymer surface (essentially, distribution of thickness of adsorbed layer) is shown in FIG. 10, and a map of distribution of adhesion forces is drawn up in FIG. 11, according to that clusters of cadmium are identified (low values of adhesion force). Surface fragment of matrix of gold ohmic contacts, placed at GaAs base, is drawn up in FIGS. 12, 13, moreover a map of surface topography is shown in FIG. 12, and map of values of electric tunnel current between surface and probe upon difference in potential between them of 1V is shown in FIG. 13. Fragment of matrix surface of triangles, made from polymethylmetacrilate on silicon base, is drawn up in FIGS. 14, 15, moreover a map of surface topography is shown in FIG. 14, and a map of electrostatic interactions between probe and surface at the moment of contact upon difference in potential between them of 1V is shown in FIG. 15.
Figure 4:
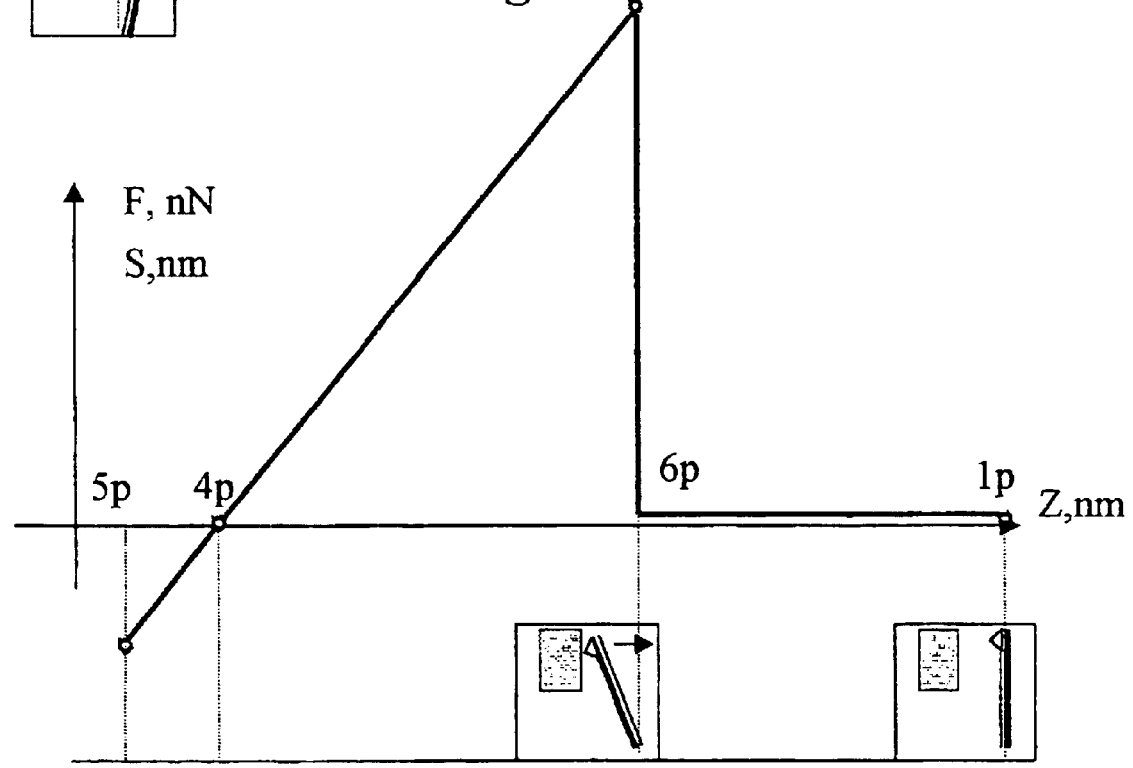
Figure 5:
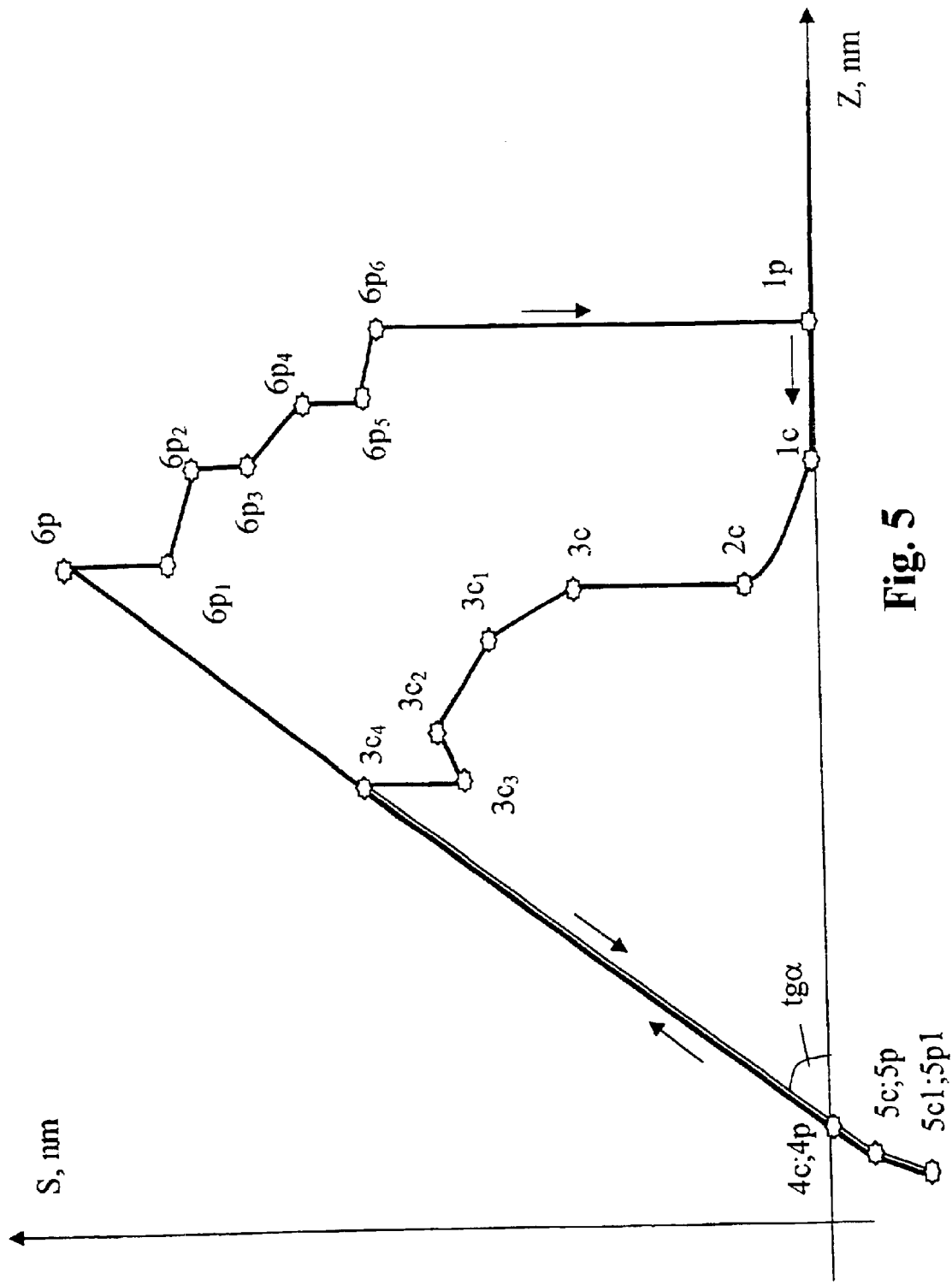

Probe 9 (FIG. 3) in point 1c is removed from the surface of sample 1 and it is not affected by surface forces (points of control and reverse point, received during approach (move apart) of sample 1 and probe 9, are marked by "c" ("p") index in FIG. 3–5). Probe 9, within approach to the surface of sample 1, is influenced by forces of long-range interaction, and cantilever 3 starts bending (2c point). Probe 9, brought close enough to surface and got into affection of sufficient and instantly shifting forces, is attracted jumpy to surface, instantly bending cantilever 3 (3c point). Further motion of fixed cantilever's 3 end to the surface of sample 1 will decrease cantilever's 3 bending and it will be fully straightened in 4c point Bending of cantilever to contrary side will be started within continuation of motion to surface. Direction of motion is shifted to the contrary in 5c point (point of reverse). Position of this point is determined by operator or processor 7.

Inverse process takes place within removing of fixed cantilever's 3 end from the surface of sample 1 (FIG. 4). Cantilever 3 is straightened (4p point) and starts bending to surface, because surface adhesion forces hold probe 9 and they do not allow cantilever to leave it. Finally, spring force of cantilever 3 increases as much as it exceeds adhesion force and probe 9 leaves surface. Cantilever is straightened (6p point). Cantilever comes to 1p point after straightening.

It comes from examination of force curve, that magnitude of absolute maximum in 6p point, expressed in values of force, is a value of local adhesion force in predetermined point of surface, i.e. force, which continuously presses probe 9 to surface. Moreover, value of this force is directly measured in point of shift of slope or at the beginning of jump of force curve. Portions between 3c–5c and 5p–6p points (FIG. 3, 4) show magnitude of cantilever's bending (elasticity force of cantilever's deviation), when probe is in direct contact with surface. This portion of force curve is called contact Information about topography of surface topography can be received, registering a value of abscissa of any identically determined point on contact portion of force curve, as coordinates of these points determine vertical position of probe 9 on surface, within applying of force of predetermined magnitude to probe (ordinate of point, determining spring force of cantilever, plus ordinate of 6c point, determining surface adhesion force, also influencing probe 9 at this moment). The criterion of choice of point at portion can be magnitude of its ordinate. Upon that, the advantage of the applied method is, that minimum range of magnitudes is registered during one measuring process, in each point of sample's 1 surface; e.g. surface topography and magnitude of adhesion force are in the easiest case. This force can be distributed irregularly at the surface and it can achieve considerable magnitudes, bringing sufficient error into topography measurement in known methods. Using the applied method, fully passing through force curve and noting topography and magnitude of adhesion force, magnitude of summary force can be determined precisely, with what probe influenced surface in registered point (sum of adhesion force and spring force of cantilever), and correction for measured value is figured out, or correction of coordinate of chosen point of measurement by using determined magnitude of adhesion force, within second reading of force curve in the same surface point is carried out. In other words, measurement of topography of surface topography can be carried out more exactly, without errors, caused by influence of surface adhesion force.

Motion in the direction of surface (within reading of force curve) is carried out before achievement of magnitude of cantilever's bending force, defined by operator, if it is necessary, the coordinate of cantilever's fixed end is recorded, and then shift of motion direction (reverse) takes place, that prevents damage of probe 9.

Data can be registered, essentially analogue of data, received by vibration methods, within registering abscissa of 3c point, where probe adhesing to surface. However, these data have information not only about surface topography, but about soft and mobile molecular layers, laying on surface. But it is much more informative to measure distance between abscissas of 4c point or point, chosen for receipt of information about topography, and 3c point. Thus, independent information about thickness of molecular layers on surface can be received, after its separation from information about topography.

Presence of adsorbed molecular layers or layers, deposited by any method, changes view of force curve (FIG. 5). So, layers, freely letting probe 9 pass through, will change distance between 3c and 4c points. Probe 9 can adhere to molecular layer firstly, pass through it, and then adhere yet to surface of sample 1. Deformation of surface layers, caused by probe 9, can take place with their further breakthrough or without. Molecular layers can be deformed and move themselves to probe. All these events will be shown at force curve in the interval between $2c$–$3c_4$ points. Coordinates, relative to surface, properties and thickness of these layers can be determined, and distributions of these magnitudes on a surface site under investigation can be received, carrying out mathematical operations with coordinates of force curve in points of control, corresponding to these portions, noting coordinates of limiting points of quasi-rectilinear portions, measuring distance between them and slopes of these portions. It is possible to determine dynamics of their deformation and value of diffusion coefficient (carrying out repeated readings of force curve, and making time pause).

Slope of portions of contact part of force curve determines surface's elastic (mechanical) properties between $3c_4$–$4c$–$5c_1$ and $5p_1$–$6p$ points (FIG. 5), that is in portion of curve, where probe gets in contact with surface. It is possible to determine Young module of material of contacting site of surface and then identify its composition, knowing cantilever's spring coefficient, material of probe and contact area. It is possible also to determine relative coefficient of elasticity of surface, only using value of cantilever's spring coefficient and slope of contact portion of force curve or only slope angle. Maps of elastic properties of surface's sites under investigation can be received, measuring this slope (angle, tangent of angle). Portions will appear at contact part of force curve (within investigation of surface, consisting of several layers with different elastic properties or covered by any dense elastic layers, capable to prevent passing of probe 9 through them), corresponding to these layers, which slopes show their elastic properties, and projections on Z axis show their thickness (see FIG. 5, 5c, 5p and $5c_1$, $5p_1$ points). It is analogous for more "sensitive" above-surface layers. Probe 9 (within passing through them or their deforming), is affected by their resistance, which influences slope of appropriate part of force curve. And thus, magnitude of this slope shows their elastic (mechanical) properties. If probe 9 breaks through some of layers, typical overshoot (jump up) appears at force curve. If irreversible changes take place within contact interaction of probe 9 with surface, contact part of force curve, which is read during motion of cantilever 3 in the direction from surface, will differ from appropriate area of force curve, which is read within approach of sample and probe. Thus, it is possible to observe shift of elastic properties of surface layers and their thickness, measuring (within scanning process) coordinates of points of control, limiting portions of different slope. Sites, infringed within scanning, can be determined, within registering of points of layers' break-through or discrepancy of chosen portions of curves of cantilever's 3 bringing up and removal.

It is obvious, that magnitude of surface deformation will be different upon identical force influence of probe 9 on surface, but upon different elastic properties of the latter (it can happen quite often within the limits of chosen site for scanning); that leads to distortions of registered topography in the known methods, caused by its elastic properties. These distortions can be corrected in the applied method, measuring coefficient of surface elasticity (slope angle of contact part of force curve) in the same point together with measurement of surface topography.

When probe is in contact with surface (contact portion of force curve), frictional force of surface can be registered if probe is applied by a force (moving fixed end of cantilever in any chosen direction along surface. Frictional force can be obtained from magnitude of probe deviation in appropriate direction. Processes of probe's 9 going out from surface (below-surface layers) and layers, covering it (above-surface), take place within displacement of cantilever 3 in the direction from surface. If only elastic deformation takes place during approach (irreversible processes do not take place), view of going out of force curve in lower part of contact area will coincide with enter of force curve. Otherwise, the indicated portions will differ. Breaking away from surface does not take place (during going through 3c point, where probe 9 adheres to surface of sample 1), as adhesion forces continue to hold probe 9. That is why force curve will go up, and cantilever's 3 bending will increase. If surface or layer, laying on it, are deformed after along with cantilever's displacement, this deformation will be shown as a bending or a break of force curve, higher than 3c point. Slope of this portion will depend on elastic properties of a site, contacting with probe 9. Probe's 9 breaking away from surface of sample 1 and from any above-surface layers, as well breaks as of bonds, are usually shown as perpendicular down (from surface) jumps at force curve.

After the moment, when probe 9 leaves surface (6p point in FIG. 5), it has to go through molecular layers, laying on it. These layers can slow down probe's 9 going through, or they can follow it. It is represented as a typical shelf or a range of shelves at force curve, located after 6p point (FIG. 5) of break of probe 9 away from surface. Probe's 9 break from these layers (at force curve) can be characterized by either abrupt jump-down, analogous to probe's breaking away from surface, or by multi-stage mode, when some bonds are broken off in turn, or by flowing decrease to zero, when layer molecules trickle down probe 9, making it free. Values of points' ordinates, expressed in force units and measured right at the moments of breaking away from layers, at layers limits and at the moments of breaks of bonds, determine directly magnitudes of interaction force between probe and surface layers, that is they determine adhesion properties of surface layers and magnitudes of breaking bonds. Elastic properties of surface layers can be determined and intermolecular bonds also can be characterized, choosing points of control (typical portions) of reverse branch of force curve, measuring their coordinates, slopes and projections of portions as well as bends.

It is obvious, that magnitude of summary adhesion force upon complicated character of force curve will be determined as a maximum value of magnitude of cantilever's bending within its displacement in the direction from surface.

As to coordinates determination of, points of control, they can be put simply equal to appropriate values of Z-coordinate (that is to project on abscissa axis). However, they can be determined much more exactly by formula R=Z−S, where R is coordinate of a point at force curve (of probe 9), Z is coordinate of fixed end of cantilever 3, S is magnitude of deviation (bending) of cantilever 3, which is equal to (in its turn) cantilever's 3 deviation force, multiplied by its spring coefficient. Sign of this magnitude depends on the direction of cantilever's 3 bending. Formula will be R=Z+S, upon bending in the direction from surface.

It should be stressed, that we consider abscissa axis referred to sample and we think, that coordinate of cantilever's fixed end is shifted within relative approach of probe and sample. Certainly, if coordinate system is referred to cantilever, sample's coordinate will become a variable.

Measurement of surface coordinate, as it was mentioned above, can be carried out in any point of contact portion of force curve. It is easy to choose criterion S=0 or S=A or S=−A (where A is predetermined threshold value). Also the beginning of portion, where Z−S=constant (beginning of contact portion) or end of this portion can be used as criterion. Taking Into account the foregoing corrections, exact coordinates of surface without deformation by probe, are measured by mentioned below formula:

$$Roay=Ro+Fac/Kp+So(Kk/Kp)$$

Sites of surface under investigation, changing during process of measurement, and molecular layers, placed on surface, can be revealed (i.e. extent of probe influence on surface or on surface layers can be determined) by measuring of force curve in each point of surface repeatedly, registering difference between coordinates of appropriate points of control or between their values of derivatives or comparing thickness of appropriate layers. Moreover, secondary reading of force curve in the same point can be used for measurement of magnetic or electrostatic interactions at the predetermined distance from surface or directly near with it. Upon that, Z coordinate of probe adhering to surface (3c point) and coordinate of surface itself (4c point) are determined within first reading of force curve; magnetic or electric forces of interaction are measured within second going through, not reaching point of surface limit (and adhering point too) at predetermined distance. Upon that, it is essential, that distance up to point of measurement is kept relative to surface, but not relative to adhering point, as it is in known methods, and this is supported much exactly, as time interval between determination of surface coordinate and carrying out of measurement itself proves to be minimum possible in this case, and that decreases shift of distance, caused by possible drift.

It is not obligatory to carry out secondary reading of force curve in a range of cases for carrying out of such or similar measurement It is enough to record values of force curve, to choose a point on it, point which is above surface at the required distance, and to save measured value in appropriate file. This enables to note magnitudes of values of magnetic and electric interactions very close to surface, registering values, e.g., which are measured in a point, preceding adhering point, and that is impossible in known methods.

Repeated reading of force curve (in the same point of sample's 1 surface, but with shifted electric potential at conducting probe 9, which is made of conductive material), enables to differ electric charges, objects and different phases of surface, according to their electric properties. Differences in interactions between electric field of probe 9 and surfaces of different electric characteristics become apparent especially within registration of difference of appropriate magnitudes, received during reading of force curves upon different potentials at probe 9, or having potential and without it. Any points, portions, angles or any other parameters of force curve can be compared at operator's option; moreover, if probe is placed at surface (contact portion of force curve), appropriate interactions (caused by above-surface layers, which probe has already gone through) are practically excluded from a range of electrostatic interactions, and if probe is at a distance from surface, contribution of above-surface layers, placed between probe and surface at that moment, is included into interactions. The following considerations can be used for figuring out of magnitude of surface charge or dielectric penetrability.

Let us take the most simple case, when surface has conducting properties. Potential at probe is zero within first reading of force curve and it is equal to U within second reading. The force curve of only force electrostatic component will be received upon subtraction of values of points' ordinates of primary reading from values of points' ordinates of secondary reading. Force of electrostatic interaction Fe is determined by expression:

$$Fe(U)=(K/Ee)*U*(U+Q)/(2R)^2$$

where K is constant, Ee is dielectric penetrability of surface and layer material (or without layer, that depends on point of measurement),
Q is charge at sample's surface,
R is coordinate of point of measurement relative to surface.
That goes from formula:

$$Ee=(K/Fe(U))*(U+Q)/(2R)^2$$

If there is not any surface charge, values of dielectric penetrability of surface and surface layers can be received from appropriate points of force curve. If there is a surface charge, reading of force curve can be repeated upon another value of potential or upon the same value, but of other polarity (in this case, the sign of charge will be additionally identified).

One more equation will be received as a result, and two unknowns—Ee and Q—will be figured out from these two equations.

Figure 15:

One measurement (or two) is enough to get a contrast image, showing electric properties of surface and layers (see FIG. 15).

Thus, the applied method, differing from the known methods, gives possibility to register only electrostatic interactions separately from intermolecular interactions, to determine values of dielectric penetrability and surface charges separately (using these interactions), and to separate contributions into these interactions, brought into by surface and above-surface layers singly.

It is possible to determine differences of electric characteristics of different areas of the investigated surface within single measurement of force curve in each point. Upon that, modulation of magnitude and polarity of electric potential at probe 9 are carried out by harmonic or rectangular signal taking during all the curve, or taking during its defined portions (points). Differences in amplitudes of measured signal in different points of surface will be evidence of difference of electric characteristics in these points.

Figure 12:
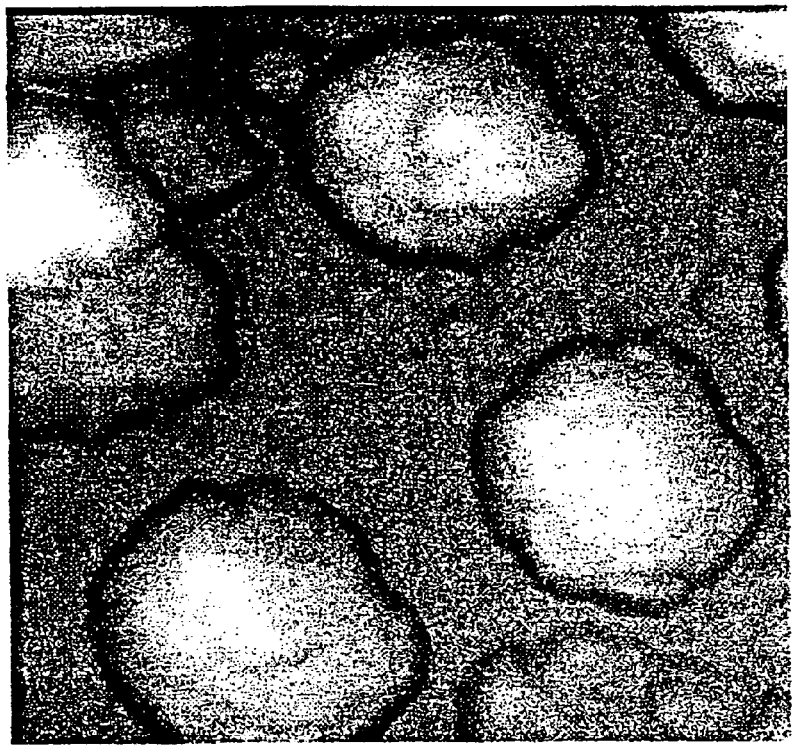
Figure 13:
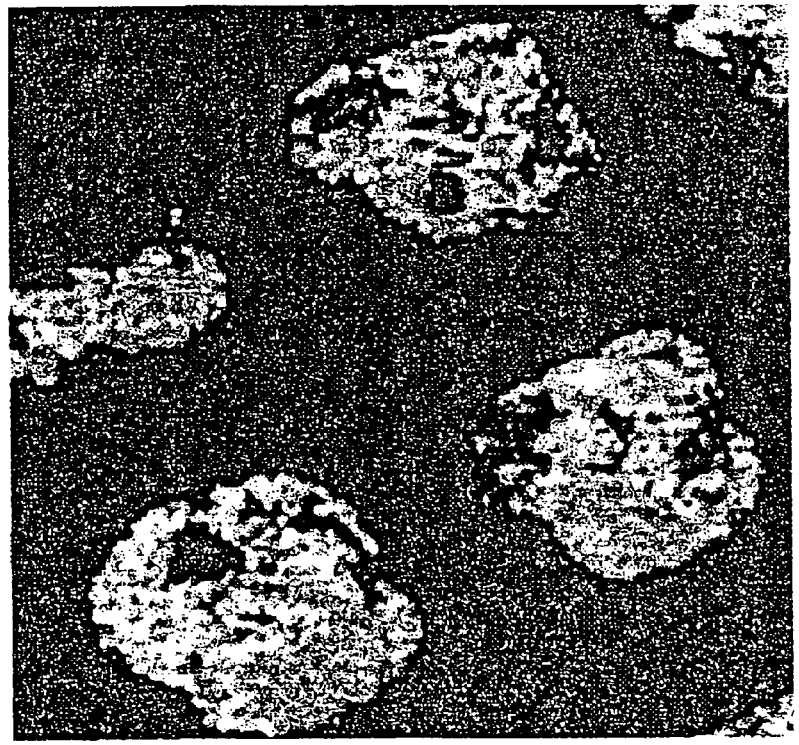
Figure 14:
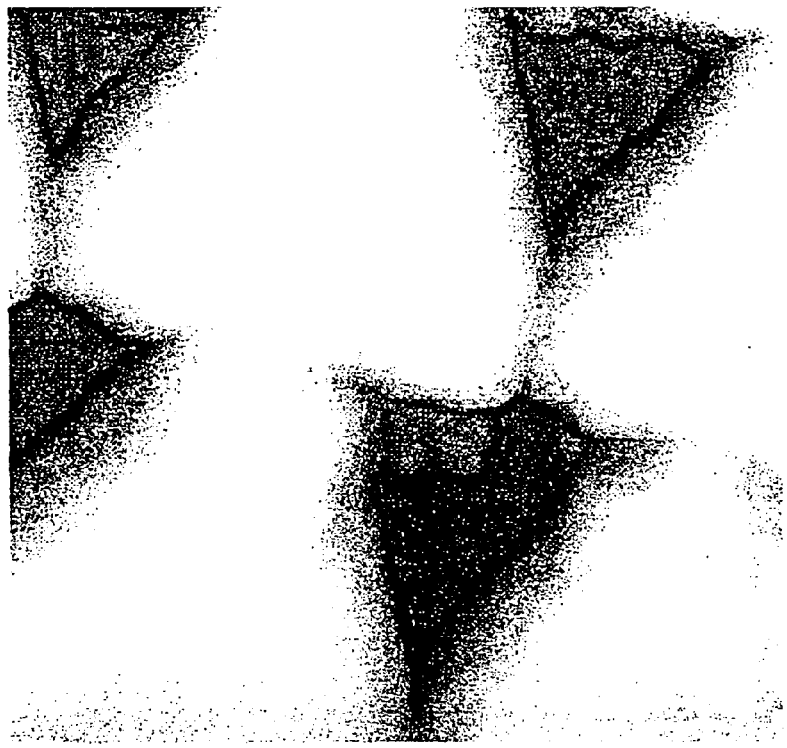

Thus, interactions of probe and sample of electric nature can be registered using the applied method. Both electrostatic interactions and interaction caused by polarization of surface or of layers, which can depend on speed of force curve reading or on frequency of modulation of applied potential are of the same range. Presence of electric conducting probe 9 also gives possibility to observe dependence of magnitude of tunnel current from position of probe 9 relative to sample's 1 surface. That is value of magnitude of tunnel current (which is measured by probe in these points) is put in accordance with each point of force curve. That enables to read maps (during scanning) of surface electric conduction in points of control (see FIG. 12, 13).

Probe, which is sensitive to any other physical and chemical characteristic of surface, can be used in the way analogous to usage of conducting probe. Magnetic, thermocouple, capacitive, optical probes etc. can be used. Magnitude of cantilever's bending also can be measured not only by normal to surface, but in perpendicular direction.

View of force curve can change and do not coincide with view of curve, shown in FIG. 5, depending on properties, dimensions and characteristics of surface, objects, laying on It, environment and probe 9 (of cantilever 3, microscope on a whole). Bends, stages, peaks, uneven portions, shifts of angles and slopes, rounding-off of sharp angles etc. can take place at force curve. All these peculiarities contain certain information and any peculiarity can be singled out with the help of the applied method and a map of its distribution can be received at the investigated site of surface. In particular, projection of difference in branches of force curve (received within approach and move apart of sample 1 and probe 9, at S axis at portion 3c4–4c–5c–5c1–5p1–5p–4p–6p), can be interpreted as magnitude of residual deformation in appropriate points. Of course, values of the same name, parameters of the type, magnitudes, relating to the same points of control, are used upon determination of difference or their comparison.

The absence of necessity to use electronic system of feedback, systems of synchronous and phase detection, simplifies implementation of the method, excludes artefacts, stipulated by finite speed of performance of the indicated systems and their relaxabon processes, that increases reliability of the received data.

We notice, getting to consideration of examples of the method implementation, that a number of possible algorithms or variants of the method are greatly numerous, however each variant can be realized without any difficulties by using of well-known ways, as measured magnitudes have been predetermined above, noted in points of control, also expression for figuring out of desired magnitudes (partially they coincide with the noted magnitudes), also terms of choice of points of control have been predetermined, rules of distributions' interpretation have been determined. In other words, each combination of the indicated magnitudes, expressions and rules assigns one of the possible variants of method's implementation.

Figure 6:
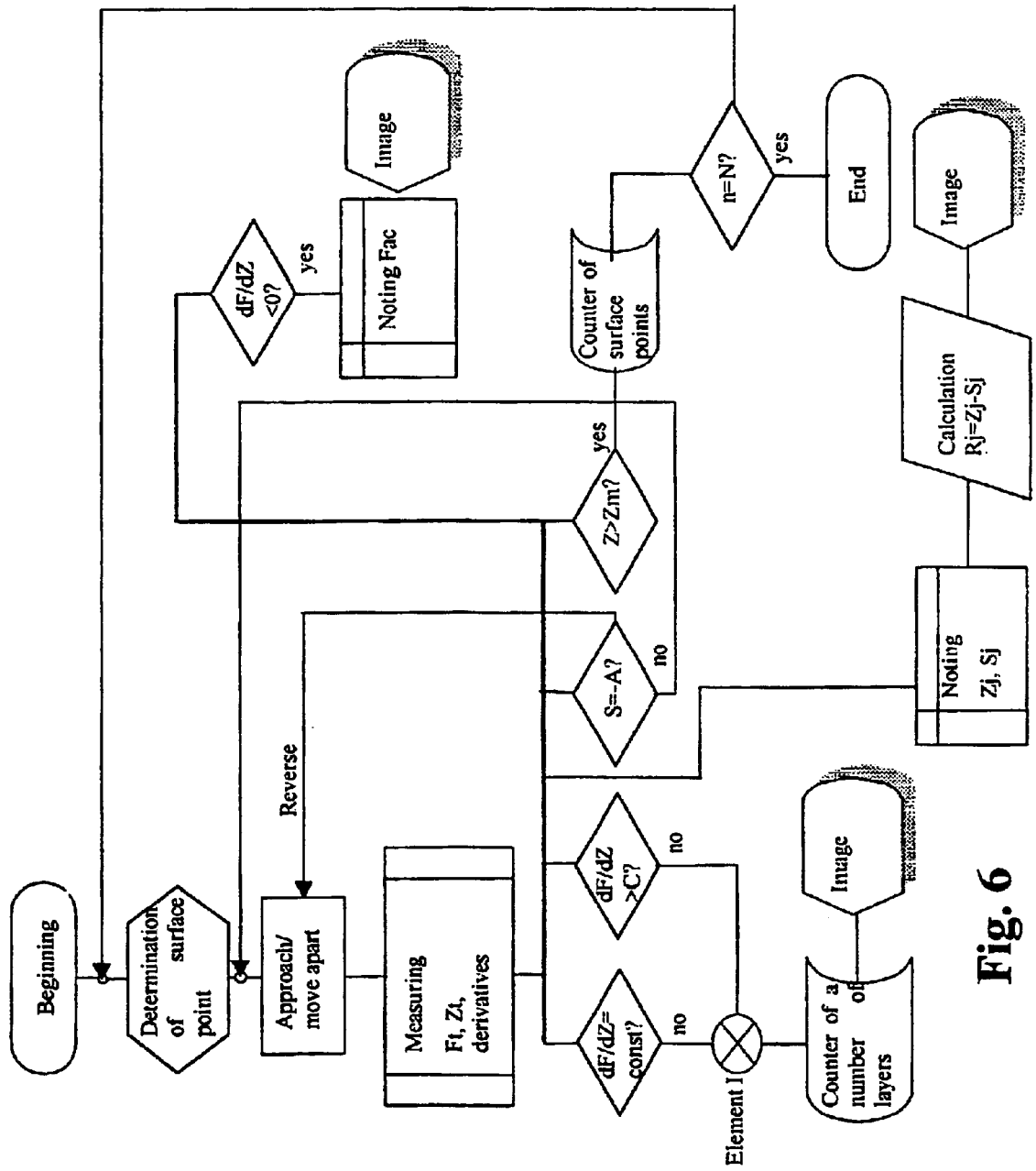

The simplest algorithm (block-scheme) of step-by-step implementation of one of the possible variants of the applied method is shown in FIG. 6. Approach of sample 1 and probe 9 starts after set up of probe 9 above first point of surface under control, accompanied by measurement of current values Ft (St), Zt, dF/dZ (in the simplest case values of derivative are taken equal to difference in "neighbor" values of Ft), $d^2F/dZ$. Signal through selection unit (element 1) goes to counter of a number of layers, fulfilling the term dF/dZ≠ constant or $d^2F/dZ ≠0$ (>C, where C is threshold magnitude), i.e. achievement of a point of control. This counter is cleared to zero after its set up above next controlled point of surface, and its indications are shown (and recorded in memory) at the moment of reverse (appropriate links are not shown in FIG. 6). The selection unit breaks off signals, relating to quasi-vertical portions of force curve, so that initial points of quasi-vertical portions are not taken into account during counting of a number of layers.

Appropriate magnitudes Zj and Sj are noted simultaneously with noting of the fact of going through layer; after that Rj=Zj–Sj is figured out and imaged, where Rj—coordinate of limit of i-layer.

Figure 9:
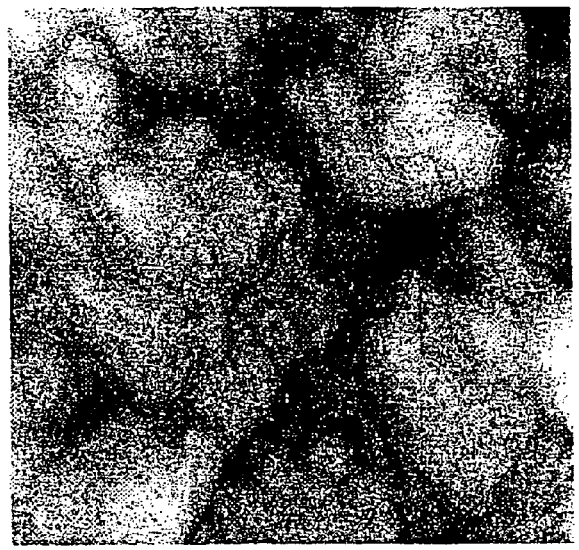
Figure 11:

Coordinate of sample's 1 surface is noted and reverse of the motion direction is realized at the moment of fulfillment of the term S=–A; approach of sample 1 and probe 9 gives place to their move apart (mutual moving away), which takes place up to achievement of Zin point, remote enough from sample's surface. Probe 9 is set up above new point of surface, and the process of scanning goes on up to fulfillment of the term n=N. i.e. before going through of all the controlled points surface. As a result, a map can be received, showing a number of layers at the surface, maps of surface layers (each layer separately) and topography of surface, shown in FIG. 9. Only point of absolute maximum is noted in the considered example at the back branch of force curve, where cantilever's 3 deviation force is equal to adhesion summary force Fac, the distribution of which is shown in FIG. 11.

Figure 7:
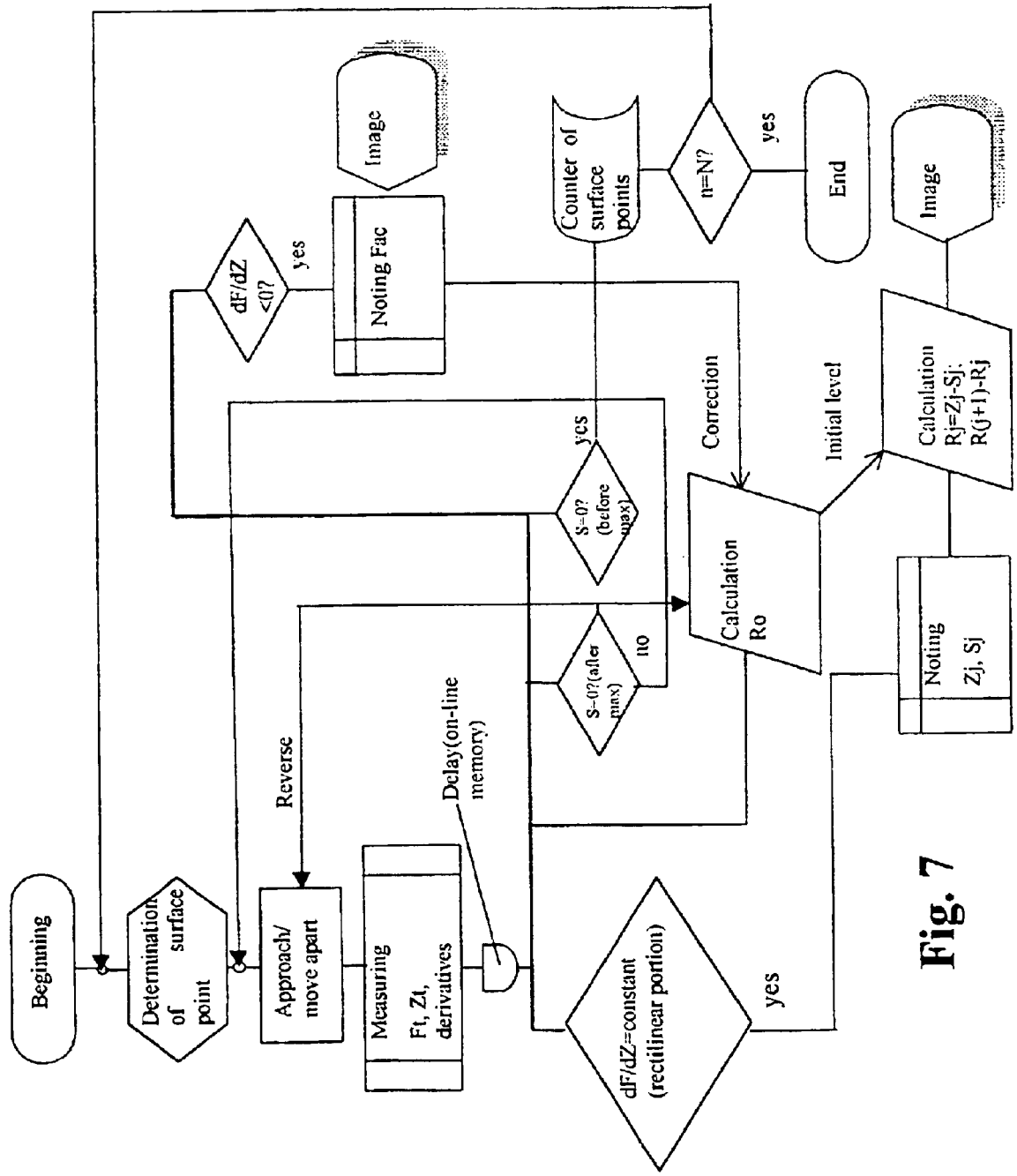
Figure 8:
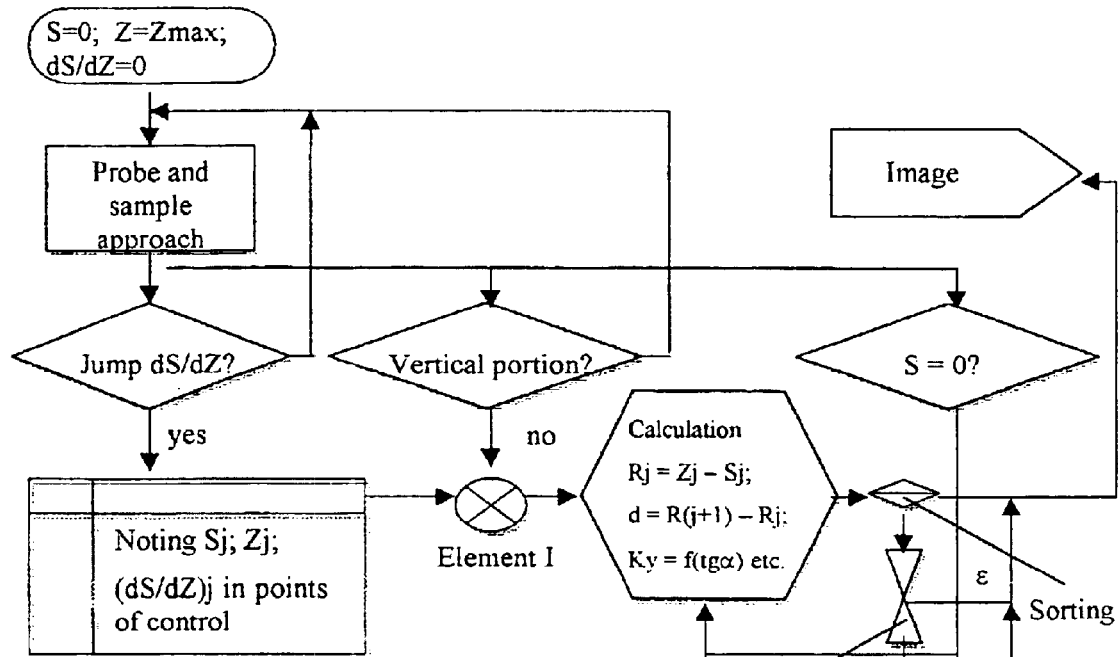
Figure 8:
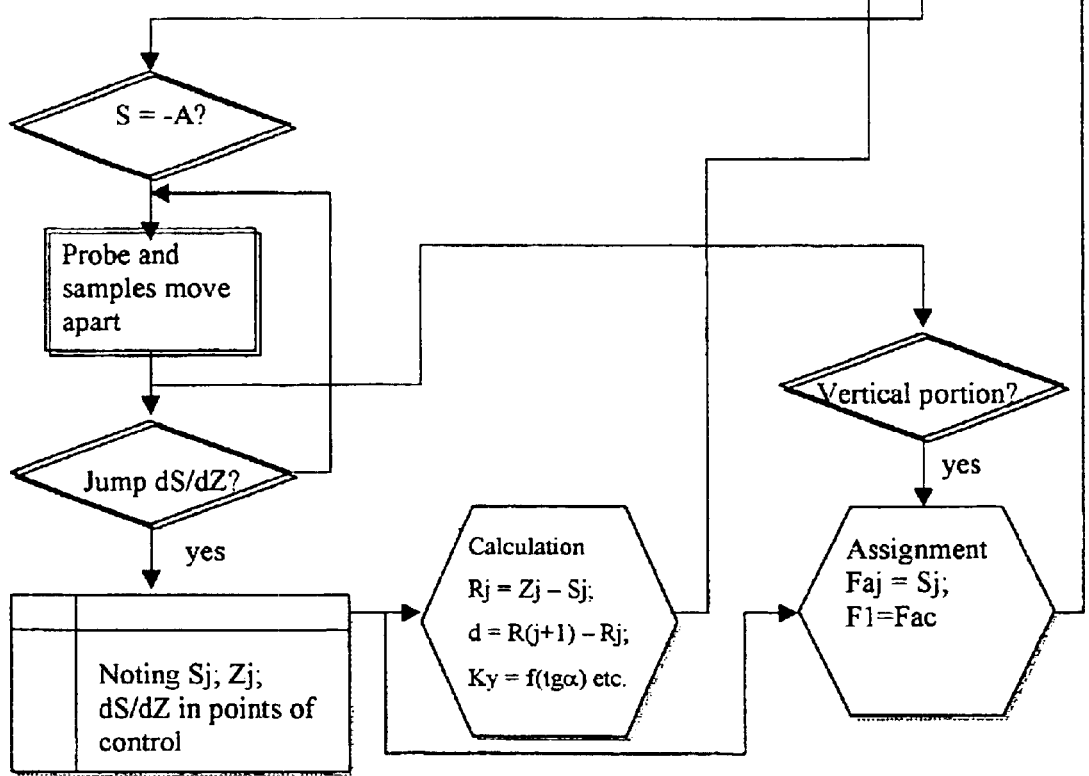

Measured values of cantilever's 3 deviation force and coordinates of its fixed end (in the example, shown in FIG. 7) are recorded in one-line memory, where a portion of force curve is kept and continuously renewed. This enables to single out quasi-rectilinear portions, bordering points of which are noted as points of control. Besides, reverse (differing from the variant, shown in FIG. 6) takes place upon zero cantilever's 3 deviation within the approach process; and repeated achievement of zero deviation is noted as the end of the process of force curve reading in predetermined point of surface after going through of absolute maximum of deviation force in the process of move apart of sample 1 and probe 9.

Figure 10:

Except this, magnitude Fac is used for receipt of correction for surface coordinate, which is an initial point for determination of layers' limits in its turn. The result of this algorithm is map of surface topography (FIG. 9), maps of relieves of surface layers relative to surface (FIG. 10) and map of distribution of adhesion force (FIG. 11).

And finally, the peculiarity of block-scheme in FIG. B is additional determination of thickness of surface layers, their elastic properties and elastic properties of surface, as well as comparison (determination of difference in, giving evidence about non-elastic deformation or calculation of arithmetic mean in order to decrease casual component of error) of data, received within the process of approach and move apart of sample 1 and probe 9.

Of course, the foregoing algorithms should not be taken into consideration as electric schemes and programs, as well as variants of implementation, resulting in the greatest effect. However, the foregoing examples, which are block-schemes, give exhaustive idea of rules and modes of schemes' and programs construction, using of present description. Thus, the applied method provides greater functional possibilities owing to receiving of constrast layer-by-layer distributions of maps, corresponding surface topography, upon simultaneously increasing of accuracy and authenticity of measurement information. The method is also caracterized by high productivity and simplicity in realization, as far as volume of measuring information is minimized there and all the information is received withing the process of single reading of force curve.

Applicant:

What is claimed is:

1. A method of information collection and processing of a surface of a sample, said method comprising the steps of
successive reading of a at least a portion of a force curve, at predetermined points of the surface under control during at least one of approaching and moving apart of the sample and a probe, set up as a cantilever, and
making a determination according to parameters of the sample with further construction of space distributions, which differs by, a choice of points of control and values of a deviation force noted during reading of the at least a portion of the force curve, or coordinates of a fixed end or derivatives from the deviation force of a coordinate of the fixed end are at least in the points of control of the force curve and according to said values in corresponding points of control and to a number of the points of control, a determination is made of the parameters of the sample, characterizing topography, properties of the surface of the sample, the number of the points of control and properties of surface layers of the sample.

2. The method, as set forth in claim 1, wherein one of the following is used: coordinates of the surface of the sample, coordinates of limits of the surface layers, thickness of the surface layers, adhesion force of the surface of the sample, adhesion force of the surface layers, elasticity coefficient of the surface of the sample, elasticity co-efficient of the surface layers, frictional force of the surface of the sample, the surface layers are used in the character of the parameters, topography, properties of the surface of the sample and a number and properties of the surface layers.

3. The method, as set forth in claim 2, wherein a number of the surface layers of the sample is determined as a number of points of control, limiting quasi-rectilinear portions of the force curve; or as a number of points, where the force curve shifts slope jumpy without unit and reverse point within the process of approaching and moving apart of the sample and the probe.

4. The method, as set forth in claim 3, wherein initial points of quasi-vertical portions are not taken into account upon determination of a number of the surface layers of the sample.

5. The method as set forth in claim 2, wherein the coordinate of the surface of the sample is determined by a relationship:

$$Ro=Zo-So$$

wherein Ro is the coordinate of the surface of the sample, and

Zo, So is the coordinate of the fixed end and magnitude of deviation of a free end at a moment of achievement of a value, equal to 0 or −A within the approach of the sample and the probe, and 0 or +A within the moving apart of the sample and the probe, where A is a positive constant magnitude.

6. The method, as set forth in claim 2, wherein the coordinate of the surface of the sample is diagnosed upon fulfillment of the term Zt−St=a constant, where Zt and St are current values of the coordinate of the fixed end and of a magnitude of deviation of the free end.

7. The method, as set forth in claim 2, wherein coordinates of limits of the surface layers of the sample are determined as coordinates of the fixed end in the points of control, not including initial points of quasi-vertical portions within the approach of the sample and the probe and final points of quasi-vertical portions within the moving apart of the sample and the probe.

8. The method, as set forth in claim 7, wherein the coordinates of the limits of the surface layers of the sample measured within the approaching and moving apart, are determined relative to a coordinate of the surface, which is measured also during the moving apart or approaching of the sample and the probe.

9. The method, as set for in claim 2, wherein coordinates of limits of the surface layers of the sample and thicknesses are determined according to a relationship:

$$Ri=Zi-Si, \; Di=[R(i+1)-Ri],$$

where Ri and Di are coordinates of a limit of an i-layer and thickness, where i=(0, 1, 2 . . . ), and Zi, Si are coordinates of the fixed end and a magnitude of deviation of a free end in an appropriate point of control, not including initial points of quasi-vertical points within the approach of the sample and the probe, and final points of quasi-vertical portions within the moving apart of the probe and the sample.

10. The method, as set forth in claim 2, wherein coordinates of limits of the surface layers of the sample and thicknesses are determined according to relationships:

$$R'i=Zi-Si-Ro, Di=[R'(i+1)-R'i],$$

where R'i and Di are coordinates of a limit of an i-layer, relative to the surface of the sample and thickness where i=(0, 1, 2 . . . ), and Zi, Si are coordinates of the fixed end and a magnitude of deviation of a free end in an appropriate point of control, not including initial points of quasi-vertical portions within the moving apart of the sample and the probe.

11. The method, as set forth in claim 2, wherein an adhesion force of the surface layers of the sample is determined by values of the deviation force in the points of control, not including final points of quasi-vertical portions during the moving apart of the sample and the probe.

12. The method, as set forth in claim 2, wherein a summary adhesion force of the surface and the surface layers of the sample is determined as an absolute maximum of the deviation force within the process of moving apart of the probe and the sample.

13. The method, as set forth in claim 2, wherein a coordinate of the surface of the sample is determined with a correction for summary adhesion force, which takes place between the probe and the surface, according to a relationship:

$$Roa=Ro+Fac/Kp,$$

where Roa is a coordinate of the surface of the sample with a correction taking into account a summary adhesion force, which takes place between the probe and the surface, where Fac is the summary adhesion force of the surface of the sample, $$Kp=Kk*tg\alpha/(1-tg\alpha), \text{ and}$$

Kk is a coefficient of elasticity, and $tg\alpha$ is a slope of the force curve in the vicinity of point Zo.

14. The method, as set forth in claim 2, wherein a coordinate of the surface of the sample is determined with a correction taking into account elastic properties of the surface, according to a relationship:

$$Roy=Ro+So(Kk/Kp) \text{ upon } Ro=Zo-So,$$

$$Roy=Zt-St+St(Kk/Kp) \text{ upon } Zt-St=\text{constant},$$

where Roy is a surface coordinate.

15. The method, as set forth in claim 2, wherein a coefficient of elasticity of the surface layers of the sample is determined according to a relationship:

$$Ki=B*Kk* tg\alpha i/(1-tg\alpha i), \text{ where}$$

$tg\alpha i$ is a slope of a portion of the force curve, placed between appropriate points of control, and B is a coefficient of proportionality.

16. The method, as set forth in claim 2, wherein a coefficient of elasticity of the surface of the sample is determined according to a relationship:

$$Kp=Kk*tg\alpha/(1-tg\alpha),$$

where Kp is a coefficient of elasticity of the surface of the sample.

17. The method, as set forth in claim 2, wherein the approaching and moving apart of the sample and the probe are carried out before achievement of a threshold value by the deviation force.

18. The method as set forth in claim 1, wherein a set of arguments are formed by values of the deviation force or the coordinate of the fixed end or derivatives from the deviation force of the coordinate of the fixed end at least in the points of control; determination of parameters is carried out by forming a set functions, using received arguments and determination of values.

19. The method, as set forth in claim 1, wherein points, limiting quasi-rectilinear portions of the force curve, or points, where force curve shifts slope jumpy, are chosen as the points of control.

20. The method, as set forth in claim 1, wherein points, where the coordinate of the fixed end of the cantilever or a force of the deviation or first or second derivatives according to the coordinate of the fixed end, achieve threshold values received using results of previous scanning or measurement as the points of control.

21. The method, as set forth in claim 1, wherein construction of space distributions is carried out relative to coordinate of the surface of the surface.

22. The method, as set forth in claim 1, wherein choosing of the points of control or noting of values of the deviation force, or coordinates of the fixed end, or derivatives from the deviation force of the coordinate of the fixed end, are carried out after filtration of a set of current values of the deviation force and the coordinates of the fixed end.

23. The method, as set forth in claim 1, wherein a determination of the parameters, using noted values of the deviation force or coordinates of the fixed end or derivatives of the deviation force of the coordinate of the fixed end in a predetermined subset of points of control is carried out, taking into consideration values of indicated magnitudes in other subsets of the points of control.

24. The method, as set forth in claim 1, wherein the determination of the parameters is carried out according to noted values of the deviation force or the coordinate of the fixed end or derivatives from the deviation force according to the coordinate of the fixed end in the points of control, placed before and after or after and before an absolute maximum of the deviation force within the process of the sample and approaching and moving apart accordingly.

25. The method, as set forth in claim 1, wherein a reading of the force curve is carried out more than one time in predetermined points of the surface of the sample under control.

26. The method, as set forth in claim 1, wherein a reading of the force curve at predetermined points of the surface of the sample under control is carried out within the approaching and moving apart of the sample and the probe; and a magnitude of residual deformation is determined using a difference of received values of the parameters.

27. The method, as set forth in claim 1, wherein a modulated electric potential is applied to the probe during a reading of the force curve, and a magnitude of force of electric interaction of the probe and the surface or the surface layers of the sample is determined by a summary signal, using demodulation.

28. The method, as set forth in claim 1, wherein a reading of the force curve control is carried out more than one time in at predetermined points of the surface of the sample under control, upon different electric potentials of the probe relative to the surface of the sample, determining a magnitude of electric interaction force of the probe and the sample or the surface layers of the sample, using a difference of received values of the deviation force.

29. The method, as set forth in claim 1, wherein a reading of the force curve control is carried out more than one time at predetermined points of the surface of the sample under control, upon different electric potentials of the probe relative to the surface of the sample, determining a magnitude of a gradient of electric interaction force of the probe and the surface or the surface layers of the sample, using a difference of received values of derivatives of the deviation force, according to the coordinate of the fixed end.

30. The method, as set forth in claim 1, wherein a registration of magnitude of a tunnel current between the probe and the surface of the sample is carried out together with a reading of the force curve or of a portion thereof, using received set of values for construction of a distribution of electric conduction of the surface or the surface layers of the sample.

* * * * *